May 18, 1948. W. J. FLETT 2,441,877
BEACON SYSTEM
Filed June 4, 1943 3 Sheets-Sheet 1
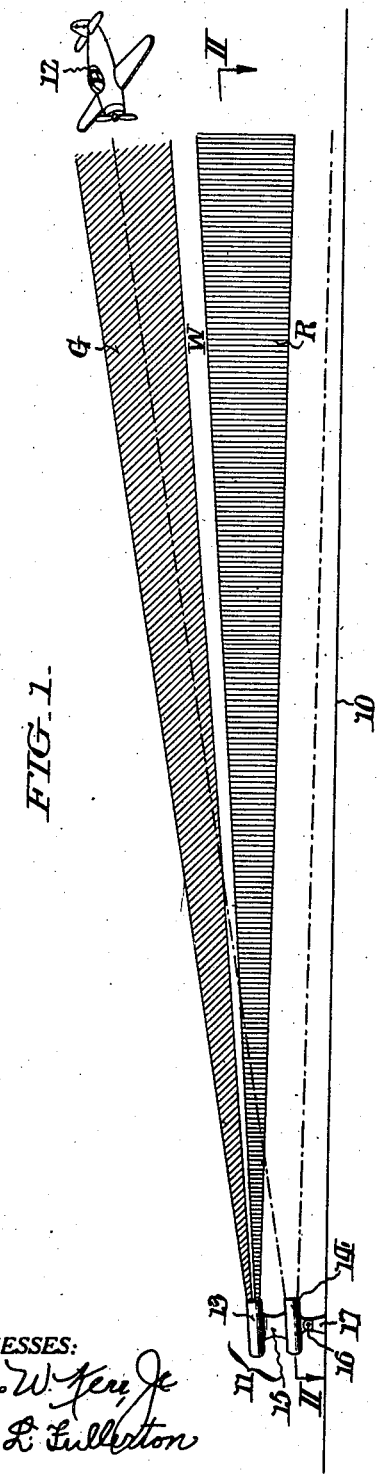
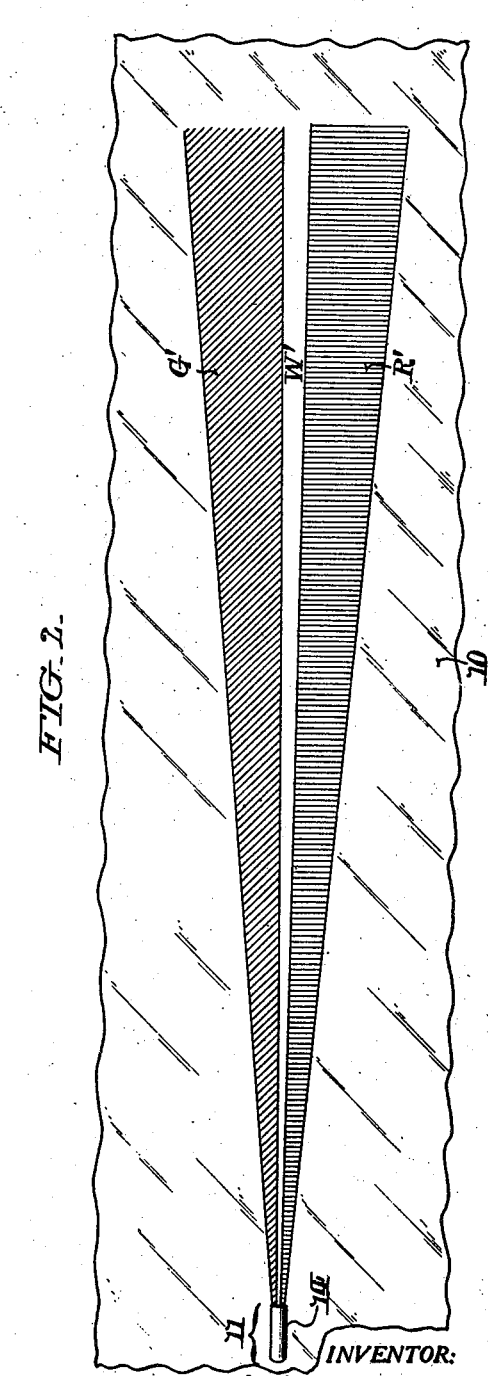
WITNESSES:
INVENTOR:
William J. Flett,
BY
Paul + Paul
ATTORNEYS.

May 18, 1948.  W. J. FLETT  2,441,877
BEACON SYSTEM
Filed June 4, 1943  3 Sheets-Sheet 2
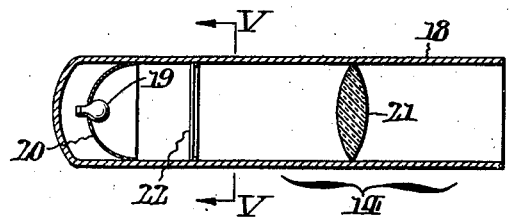
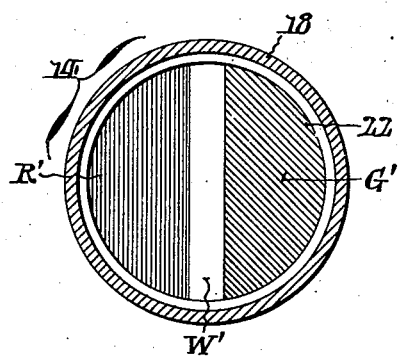
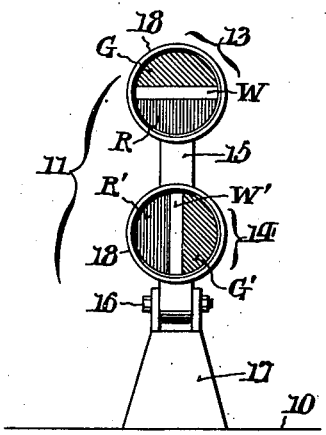
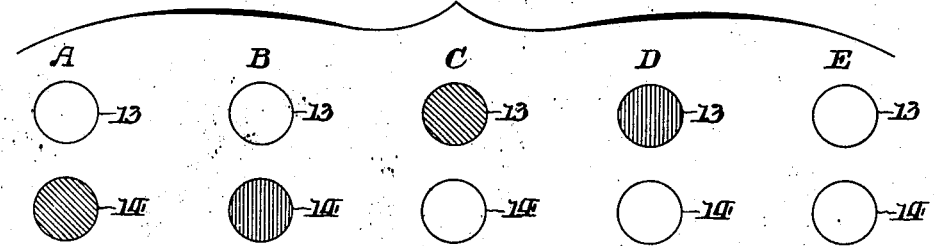
WITNESSES:
INVENTOR:
William J. Flett,
BY
Paul & Paul
ATTORNEYS.

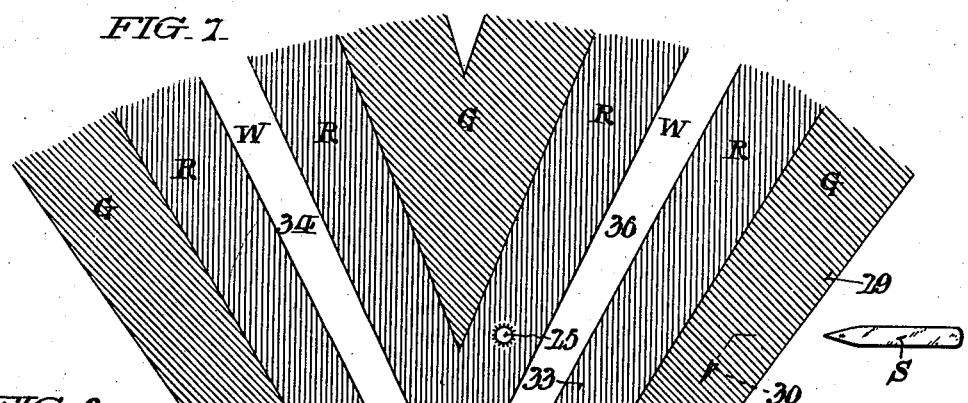
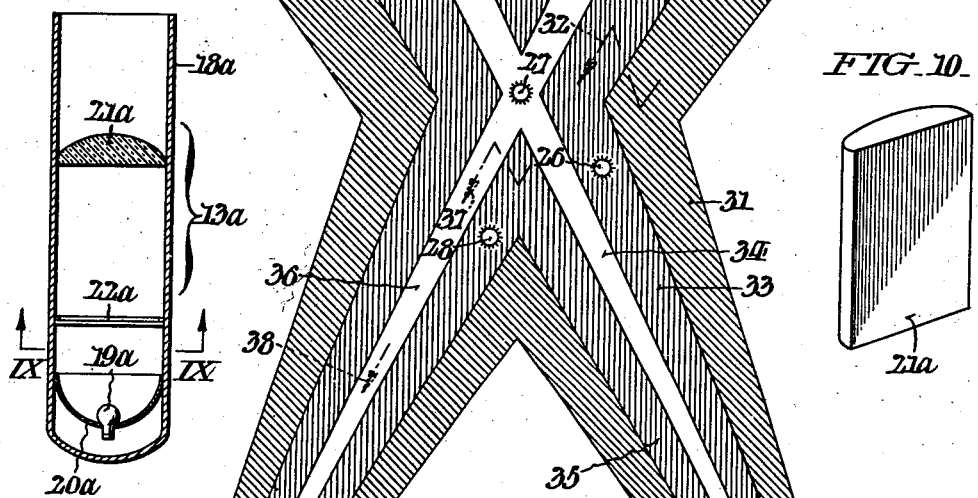
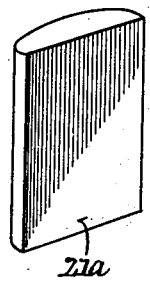
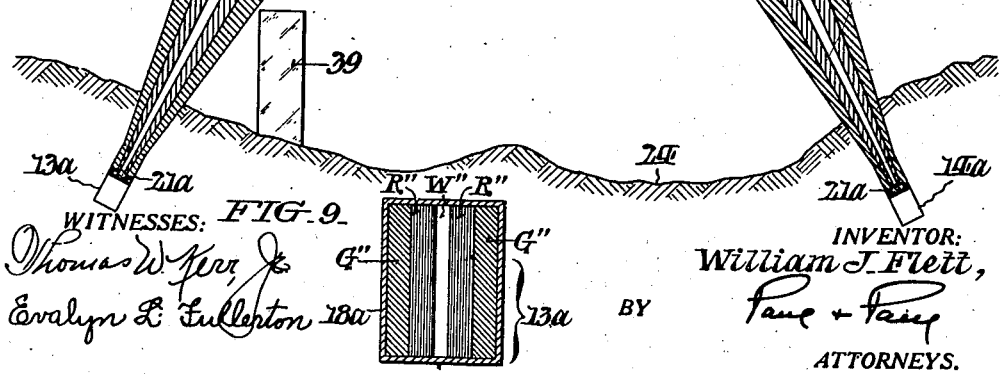

Patented May 18, 1948

2,441,877

UNITED STATES PATENT OFFICE 2,441,877

BEACON SYSTEM

William J. Flett, Lansdowne, Pa.

Application June 4, 1943, Serial No. 489,657

3 Claims. (Cl. 240—1.2)

This invention relates to beacon systems useful for example in guiding air craft to landing fields at night in the absence of flood lighting, or in directing ships into harbors past invisible obstructions, especially in times of war to avoid collision with pre-set mines or other destructive devices.

These purposes are accomplished in accordance with my invention as hereinafter more fully disclosed through provision of lamps which emit, through suitable lenses, main or directional light beams of one color and flanking light beams of other colors, which latter will indicate the direction of lateral deviation from the directional beam and hence serve as guides to the pilots of air craft or ships, as the case may be, in steering toward and keeping in the line of said main beams until landing is effected. In the case of beacons for air craft guidance in landing, my improved system not only indicates the direction which the flight is to take in approaching the landing field, or port, but also the angle of inclination so that landing may be effected without danger of mishap.

Other objects and attendant advantages will appear from the following detailed description of the attached drawings, wherein Fig. 1 is a view in side elevation of a beacon system constructed in accordance with my invention and intended for use more particularly to direct air craft to a landing port or field.

Fig. 2 is a horizontal section looking as indicated by the angled arrows II—II in Fig. 1.

Fig. 3 is a view showing the front elevation of the double beacon lamp means used in the system.

Fig. 4 is a longitudinal sectional view of one of the lamps.

Fig. 5 is a cross section of one of the lamps taken as indicated by the angled arrows V—V in Fig. 4.

Fig. 6 is a diagrammatic view showing how the beams from the lamps appear to the aviator under different conditions of approach.

Fig. 7 is a view in plan of a beacon system arranged in accordance with my invention for guiding ships into a harbor.

Fig. 8 is a horizontal or plan section of one of the lamps used in the beacon system of Fig. 7.

Fig. 9 is a cross sectional view taken as indicated by the angled arrows IX—IX in Fig. 8; and Fig. 10 is a perspective view of the projecting lens of one of the lamps shown in Fig. 8.

With reference first more particularly to Figs. 1 and 2 of these illustrations, 10 designates the ground line of an airport or landing field; 11 the beam projecting means of my improved beacon system; and 12 an airplane approaching the field. The beacon projecting means, it will be noted from Fig. 1 and from Fig. 3, comprises a pair of lamps 13 and 14 which are connected as at 15 for maintenance of their axes in parallelism, and which are pivoted as at 16, to a fixed support 17 so that they may be angularly adjusted relative to the horizontal in accordance with the type of plane or air craft which is to be directed to the airport or landing field. Except as hereinafter particularly pointed out, the lamps 13 and 14 are identical in construction, each having a cylindric casing 18 (see Figs. 4 and 5) with a light source 19 in its rear end centralized in a reflector 20; a suitable projecting lens 21, for example a double-convex lens, well inward of its front end, and a screen 22 interposed between said bulb and said lens. As shown in Fig. 3, the screen of the upper lamp 13 has a horizontally arranged medial bar area W of one color which may be white, and areas G and R of different contrasting colors which may be green and red respectively above and below said medial area. The screen of the lower lamp 14, on the other hand, has a vertically arranged medial bar area W' of one color which may be white, and flanking areas R' and G' of different colors which may be red and green respectively.

Upon entering the field of the beacon and moving toward the lamps 13 and 14 from the front, the pilot of the approaching air craft will see the beams from both lamps colored in accordance with his proximity to the direct line of the beacon. If white appears above green as at A in Fig. 6, he will know that he is off the glide path to the right; if white appears above red as at B, it will indicate that he is off the glide path to the left; if green appears over white as at C it will indicate that he is too high on the glide path; and if red appears over white as at D, he will know that he is too low in the glide path; whereas if white appears over white as at E, it will indicate that he is exactly on the beacon and can therefore proceed with safety to landing. Due to the provisions made for adjustment of the lamps 13 and 14 as above explained, the angle of the beacon may be set to show the proper glide path for different types of planes and to clear obstructions which may be within or adjacent the landing area. It will be evident that my improved beacon system can be employed in cases of low visibility due to fog since the lamps do not illuminate the landing field, and since visibility is greater when looking directly into a beam than when a floodlight is used to illuminate an area by reflection. My improved landing beacon is thus advantageous in that it makes possible the safe landing of air craft at night or in fog, and in that it favors secrecy as to the location of air bases in the time of war. Additional flanking contrasting color areas may be used on the screen, if found to be advantageous or desirable in practice.

In Fig. 7 which shows the beacon system of my invention arranged for guiding ships past a mine field into a harbor, I employ two lamps 13a and 14a which are positioned at spaced points along the shore-line 24 with their beams directed to intersect the area which contains the mines 25—28. The lamps 13a and 14a are exact counterparts of each other so that the detailed description which immediately follows of the one, will hold for the other. As instanced in Fig. 8, each lamp has a body 18a which is vertically oblong in cross section to receive a cylindrical lens 21a such as separately illustrated in Fig. 10 of the plano-convex type, as well as a rectangular screen 22a. The screen 22a has, in this instance, a central vertical bar area W" which may be white, and multiple flanking areas R" and G" to opposite sides of the central area W" which may be red and green respectively. Due to the shape of the lens 21a, the beams projected from the two lamps 13a and 14a will fan horizontally as shown in Fig. 7 but will be of uniform depth vertically. The operation of the system of Fig. 7 is as follows: Let it be assumed that a ship S is approaching the beam from the lamp 13a from the right and is about to enter the green field at 29. In accordance with directions radioed to the pilot from the shore, he is instructed to turn left upon entering the beam 29 as indicated by the arrow at 30 and to approach the harbor along the line of said beam 31 until he sees the green beam 31 from the lamp 14a, whence he is to change his course away from the harbor in the direction of the beam 31 as indicated by the arrow 32 until he sees the red beam 33 from the lamp 13a. Then to cross the red and the white beams 33 and 34 from the lamp 14a until he reaches the second red beam 35 of said lamp 14a. He is further instructed to proceed in the direction of the beam 35 in a course away from the harbor until he enters the white beam 36 from the lamp 13a, and finally to proceed along said white beam 36 as indicated by the arrows 37 and 38 into the harbor which is provided with a landing pier diagrammatically indicated at 39. By following these instructions, it will be seen that the mines 26, 27 and 28 are safely cleared. By similar procedure under different instructions by radio, a ship approaching from any other direction can also be safely guided past the various mines in the harbor and be safely directed to the landing pier 39, in a manner which will be readily understood from the drawings.

Having thus described my invention, I claim:

1. A beacon system for guiding the landing of air craft, comprising a pair of vertically spaced lamps, each comprising a light source, a lens for focusing the light into a beam and a screen positioned at the focal plane of said lens, the screen of one lamp having a vertically arranged clear medial bar area, and areas of different contrasting colors at opposite sides of said bar area, and the screen of the other lamp having a horizontally arranged medial bar area, and areas of different contrasting colors above and below its medial bar area; and means for supporting the lamps with capacity for angular adjustment.

2. A beacon system according to claim 1, in which the lamp axes are fixed in parallel relation and the beacon from each lamp is directed in the same direction.

3. A beacon system for guiding the landing of air craft, comprising a pair of vertically spaced lamps, each comprising a light source, a lens for focusing the light into a beam and a screen positioned at the focal plane of said lens, the upper lamp having a horizontally arranged medial clear bar area, and areas of different contrasting colors above and below said medial bar area, and the lower lamp having a vertically arranged clear medial bar area, and flanking areas of different contrasting colors; and means for supporting the lamps with capacity for angular adjustment.

WILLIAM J. FLETT.

REFERENCES CITED

The following references are of record in the file of this patent:

UNITED STATES PATENTS

| Number | Name | Date |
| --- | --- | --- |
| Re. 21,838 | Buckley | June 24, 1941 |
| 1,235,065 | Schweizer | July 31, 1917 |
| 1,279,638 | Blake | Sept. 24, 1918 |
| 1,349,277 | Honig | Aug. 10, 1920 |
| 1,343,899 | Best | June 22, 1920 |
| 1,598,044 | Bone | Aug. 31, 1926 |
| 1,846,208 | Kuehner | Feb. 23, 1932 |
| 1,989,295 | Sewell | Jan. 29, 1935 |
| 2,023,708 | Spring | Dec. 10, 1935 |
| 2,238,409 | Bomberger | Apr. 15, 1941 |
| 2,273,951 | Gibb | Feb. 24, 1942 |
| 2,386,268 | Roper | Oct. 9, 1945 |

FOREIGN PATENTS

| Number | Country | Date |
| --- | --- | --- |
| 393,501 | Great Britain | 1933 |
| 426,699 | Germany | 1926 |